United States Patent Office 3,705,175
Patented Dec. 5, 1972

3,705,175
INDAZOLE-3-CARBOXYLIC AMIDES
Laszlo Magdanyi, Andras Gelleri, Laszlo Pallos, Lujza Erdelyi, nee Petocz, and Peter Gorog, Budapest, Hungary, assignors to Egyesult Gyogyszer es Tapszergyar, Budapest, Hungary
No Drawing. Filed Mar. 26, 1970, Ser. No. 23,069
Claims priority, application Hungary, Apr. 1, 1969, EE–1,639
Int. Cl. C07d 49/18
U.S. Cl. 260—310 C
28 Claims

ABSTRACT OF THE DISCLOSURE

Indazole-3-carboxylic amides of the general formula

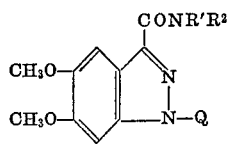

wherein
$R^1$ and $R^2$ represent independently hydrogen, straight chained or branched alkyl of up to 16 carbon atoms, cycloalkyl, naphthyl, phenyl or aralkyl group, where the phenyl and aralkyl groups may be substituted with one or two lower alkyl, alkoxy, trifluoromethyl or halo substituent, further
$R^1$ and $R^2$ may form together with the adjacent nitrogen atom and optionally with a further nitrogen atom a 5 or 6 membered heterocyclic radical,
Q represents hydrogen, alkali metal or an acyl group of 1 to 4 carbon atoms
have been prepared.

The new compounds possess valuable pharmacological activities, first of all they are potent anti-inflammatory and analgesic agents.

---

This invention relates to novel, pharmaceutically active indazole-3-carboxylic amides.

The new compounds correspond to the general Formula (I)

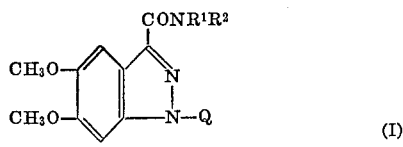

wherein
$R^1$ and $R^2$ represent independently hydrogen, straight chained or branched alkyl of up to 16 carbon atoms, cycloalkyl, naphthyl, phenyl or aralkyl group, where the phenyl and aralkyl groups may be substituted with one or two lower alkyl, alkoxy, trifluoromethyl or halo substituents, further $R^1$ and $R^2$ together with the adjacent nitrogen atom may form a 5 to 6 membered heterocyclic group, which may contain one further nitrogen atom,
Q represents hydrogen, alkali metal or an acyl group of 1 to 4 carbon atoms.

More particularly, $R^1$ and $R^2$ are independently selected from the group consisting of hydrogen, straight chained alkyl of 1–16 carbon atoms, branched alkyl of 3–16 carbon atoms, cyclohexyl, naphthyl, phenyl, phenyl lower alkyl, substituted phenyl and substituted phenyl lower alkyl wherein the substitution is with one to two substituents selected from the group consisting of methyl, methoxy, trifluoromethyl and halogen, and $R^1$ and $R^2$ together with the adjacent nitrogen atom and optionally with a further nitrogen atom may form a 6 membered heterocyclic group selected from the group consisting of piperidino, piperazino, and N-methylpiperazino.

Compounds according to the present invention are potent anti-inflammatory and analgesic agents.

There were already known some other substituted indazole-3-carboxylic amides, which have been prepared e.g. according to the following technique: isatine was treated with an equivalent amount of an alkali, the obtained compound was diazotated, reduced with stannochloride, converted to the acid by ring closure, and the obtained acid was reacted with a halogenating agent, followed by dimethylamine [ J. Am. Chem. Soc. 74, 2009 (1952), 66, 350 (1940)].

Some other compounds of the similar structure have been prepared by reacting indazole-3-carboxylic acid with thionyl-chloride and an amine [Zh. Obs. Khim. 31, 201 (1961)]. According to another process, indazole-3-carboxylic acid has been converted to its methyl ester, this latter has been heated 20 hours in a Carius tube in the presence of alcohol saturated with ammonia, and the product has been purified by vacuum sublimation [Gazz. Chim. Ital. 93, 3 (1963)].

The products of this invention having the general Formula I can be prepared according to known and new processes.

According to the new process for the preparation of the compounds of this invention an acyl amide of the general Formula II

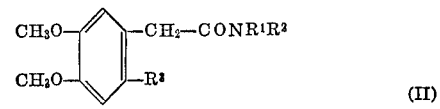

wherein $R^1$ and $R^2$ have the same meanings as stated above, and $R^3$ represents an amino group, a mineral acid addition salt of an amino group, or an alkyl- or aryl-substituted formimino radical, is reacted with a compound of the general Formula III $$R^4\text{—ONO} \qquad \text{(III)}$$

wherein $R^4$ represents hydrogen or an alkyl group of 1 to 5 carbon atoms. Accordingly, the compound of the general Formula III is nitrous acid, or a $C_{1-5}$ alkyl ester of nitrous acid.

The obtained compound of the general Formula I, wherein Q is hydrogen, can be converted into a non-toxic alkali metal salt, or an N-acylated derivative thereof, if desired.

The reaction of the compounds having the general Formulas II and III can be carried out preferably at a temperature of, or below 20° C., in the presence of a mineral acid, e.g. hydrochloric, sulfuric, phosphoric, fluoroboric acid. As solvent or suspending agent e.g. water, mineral acids, lower alkanols, carboxylic acids, ketones, ethers, or the mixture thereof can be used.

According to a particularly preferable method, the compound of the general Formula II is reacted with aqueous alkalinitrite solution at a temperature not higher than 0° C., in the presence of a hydrochloric acid-acetic acid mixture, the formed indazole-derivative of the general Formula I, wherein Q is hydrogen, is separated according to known and usual techniques (e.g. crystallization, precipitation, extraction etc.), and if desired, the product is converted into its salt or an acylated derivative by known procedures. The salt can be prepared e.g. by reacting the acid with an alcoholic metal-alcoholate solution, and the acylated derivatives can be formed using an acid chloride or an acide anhydride.

The starting compounds of the general Formula II are partly known materials. The new 2-aminophenyl-acetamide derivatives of the general Formula II can be prepared according to known processes, e.g., the corresponding α-chloro-2-nitrophenyl acetamide can be reduced in glacial acetic acid and HCl with an Adams palladium-catalyst, after which the chloro compound is converted to the free 2-aminophenyl-acetamide with cold sodium carbonate [Chem. Ber. 74, 500 (1941)].

The novel compounds having the general Formula I can also be prepared according to known methods.

According to a method known per se the compounds of the general Formula I can be prepared by reacting an ester of the general Formula IV

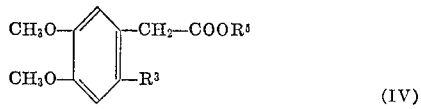

(IV)

wherein $R^3$ has the same meanings as stated above, and $R^5$ represents a lower alkyl group, with a compound of the general Formula III, i.e. with nitrous acid or a $C_{1-5}$ alkyl ester of nitrous acid.

The obtained indazole-carboxylic acid derivative of the general Formula V

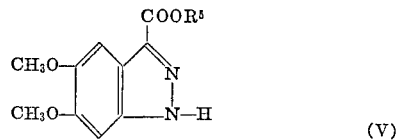

(V)

wherein $R^5$ has the same meanings as stated above—is reacted with an amine of the Formula $HNR^1R^2$—wherein $R^1$ and $R^2$ have the same meanings as stated above—to form the compounds of the general Formula I, wherein Q is hydrogen. The thus-obtained compounds can be converted to their non-toxic alkali metal salts or N-acylated derivatives, if desired.

The starting 2-amino-4,5-dimethoxyphenyl-acetic esters of the general Formula IV are partly known compounds [e.g. J. Chem. Soc. (1967), 1424]. The still new compounds can be prepared according to known procedures.

According to another method the 5,6-dimethoxy-indazole-3-carboxylic amides of the general Formula I can be prepared by converting 4-amino-veratrol to 3',4'-dimethoxy-2-hydroximino-acetanilide according to the Sandmeyer method [Helvetica Chim. Acta 2, 237 (1919)], and treating this latter with sulfuric, phosphoric or polyphosphoric acid. In this latter step ring closure takes place and 5,6-dimethoxy-isatine is formed. The obtained compound is reacted with an alkali, followed by nitrous acid, and finally with a reducing agent, preferably with stannochloride to form the new 5,6-dimethoxy-indazole-3-carboxylic acid of the Formula VII

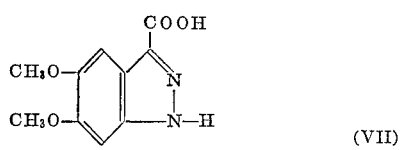

(VII)

The compounds of the general Formula I can be prepared by reacting 5,6-dimethoxy-indazole-3-carboxylic acid with an amine of the general Formula $HNR^1R^2$—wherein $R^1$ and $R^2$ have the same meanings as stated above—optionally in the presence of a carbodiimide, preferably N,N'-dicyclohexylcarbodiimide. In this latter case the reaction is carried out preferably at room temperature, in the presence of a solvent, e.g. ethyl acetate, pyridine, dioxane, dimethylformamide, acetone, etc. If the reaction is carried out in the absence of carbodiimide, the solvent can be omitted, but in this case the reaction mixture is to be heated. The obtained compounds of the general Formula I, wherein $R^1$ and $R^2$ have the same meanings as stated above, and Q represents hydrogen, can be converted into their non-toxic alkali metal salts or N-acylated derivatives, if desired.

According to a further method a nitrile compound of the general Formula VI

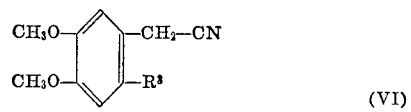

(VI)

wherein $R^3$ has the same meanings as stated above, is reacted with a compound of the general Formula III, and then the nitrile group of the obtained new 5,6-dimethoxy-indazole-3-carboxylic nitrile is converted by a known method into an acid amide radical of the formula —$CONR^1R^2$.

This conversion to the acid amide radical can be performed by treating 5,6-dimethoxy-indazole-3-carboxylic nitrile with an acid or a base, and reacting the obtained 5,6-dimethoxy-indazole-3-carboxylic acid in a manner as described above.

The 5,6-dimethoxy-indazole-3-carboxylic nitrile can be converted into the new esters of the general Formula V by a method known per se, and these latter compounds can be transformed into the compounds of the general Formula I, wherein $R^1$ and $R^2$ have the same meanings as stated above, and Q represents hydrogen. This latter reaction is described above in detail. The obtained compounds can be converted into their non-toxic alkali metal salts or N-acylated derivatives, if desired.

By hydrating the 5,6-dimethoxy-indazole-3-carboxylic nitrile according to known processes, a compound of the general Formula I is obtained wherein $R^1$, $R^2$ and Q are hydrogen. This compound can be converted into those derivatives wherein Q is alkali metal or acyl radical.

The 5,6-dimethoxy-indazole-3-carboxylic acid can be converted to its lower alkyl ester—i.e. to a compound of the general Formula V—according to known procedures. The compounds of the general Formula V can be reacted as described above with an amine of the general formula $HNR^1R^2$, to form the compounds of the general Formula I, wherein $R^1$ and $R^2$ have the same meanings as stated above, and Q represents hydrogen. These compounds can be converted into their non-toxic alkali metal salts or N-acylated derivatives, if desired.

The 5,6-dimethoxy-indazole-3-carboxylic acid can be reacted with a halogenating agent—e.g. phosphorous oxychloride, phosporous oxybromide, phosphortrichloride, phosphortribromide, phosphorpentachloride or phosphorpentabromide etc.—preferably at a temperature of 20 to 120° C., to form the new 5,6,5',6'-tetramethoxy-diindazole[2,3-a,2',3'-d]pyrazine-7,14-dione, which is separated. This latter compound is reacted with an amine of the general formula $HNR^1R^2$ to form an indazole derivative of the general Formula I, where $R^1$ and $R^2$ have the same meanings as stated above, and Q represents hydrogen. The obtained compounds can be transformed into their non-toxic alkali metal salts or N-acylated derivatives, if desired.

The compound of the general Formula I, wherein $R^1$, $R^2$ and Q are hydrogen, can be hydrolyzed to the indazole-carboxylic acid of the Formula VII according to a method known per se. The compound of the Formula VII can be reacted with an amine of the general formula $NHR^1R^2$ as described above, to form the compounds of the general Formula I, wherein Q is hydrogen, and $R^1$ and $R^2$ have the same meanings as stated above, with the proviso, that they may not stand for hydrogen. These compounds can be converted into the corresponding derivatives, wherein Q is alkali metal or acyl group.

The compounds of the general Formula I can be transformed into pharmaceutical preparations by the aid of the carriers and auxiliary materials usable in the pharmaceutical industry.

The compounds of the invention possess a wide pharmacological spectrum of activity. The different types of activities are numerically proved in the following tables.

TABLE 1

Toxicity, anti-inflammatory and analgesic activities

The toxicity of the compounds has been determined on mice. The compounds were administered intraperitoneally, and the test-animals were kept under observation during 48 hours. The anti-inflammatory activity has been determined on rats, kaolin oedema has been in-induced on the test-animals, and the rate of inhibition at the actual doses has been measured. The analgesic activity has been observed on mice, by the acetic acid writhing test, and the rate of inhibition at the actual dosis has been measured.

The 5,6-dimethoxy-indazole-3-carboxylic acid ethyl ester showed motility inhibitory effect on mice, $ED_{50}$ i.p.: about 300 mg./kg. This compound showed also an anorectic activity. The $ED_{50}$ value of the compound on rats, determined by the Spengler method is 170 mg./kg. p.o.

In the following there are listed the results of the examinations carried out on 5,6-dimethoxy-indazole-3-carboxylic acid phenyl isopropylamide and some known medicaments with respect to their anti-inflammatory and analgesic activity.

| | Toxicity $LD_{50}$, mg./kg. | Kaolin doses, mg./kg. | Oedema rate of inhib., percent | Acetic acid writhing test | |
|---|---|---|---|---|---|
| | | | | Dosis, mg./kg. | Rate of inhibition, percent |
| 5,6-dimethoxy-indazole-3-carboxylic acid | | | | | |
| -p-toluidide | 3,000 | 400 | 19 | 200 | 80 |
| -cyclo-hexylamide | 600 | 100 | 11 | 100 | 40 |
| -n-hexylamide | 750 | 100 | 12 | 100 | 80 |
| -β-(3',4'-dimethoxy-phenylethylamide) | 3,000 | 400 | 33 | 200 | 80 |
| -N'-methyl-piperazide | 385 | 50 | 2 | 25 | 52 |
| -β-phenylethylamide | 1,500 | 100 | 24 | 50 | 93 |
| -piperidide | 780 | 100 | 27 | 50 | 79 |
| -phenylisopropylamide | 3,000 | 250 | 51 | 50 | 99 |
| -ethyl ester | 3,000 | 300 | 46 | 200 | 13 |

TABLE 2

Anti-peristaltic activity, determined on mice, by the Stickney method 5,6-dimethoxy-indazole-3-carboxylic acid:     $ED_{50}$, mg./kg. i.p.
- -N'-methyl-piperazide    85
- -β-phenylethylamide    73
- -piperidide    115
- -phenylisopropylamide    86
- -ethyl ester    230

TABLE 3

Inhibition of gastric secretion, determined on rats by the Shay method 5,6-dimethoxy-indazole-3-carboxylic acid:     $ED_{50}$, mg./kg. i.p.
- -β-phenylethylamide    40
- -piperidide    100
- -phenylisopropylamide    200
- -ethyl ester    100

TABLE 4

Inhibition of saliva secretion, determined on mice by the Richter method 5,6-dimethoxy-indazole-3-carboxylic acid:     $ED_{50}$, mg./kg. i.p.
- -β-phenylethylamide    100
- -piperidide    100
- -phenylisopropylamide    450
- -ethyl ester    160

TABLE 5.—Diminution of normal body temperature, determined on rats

| | Dosis, mg./kg. | Diminution of temperature, °C |
|---|---|---|
| 5,6-dimethoxy-indazole-3-carboxylic acid | | |
| -ethyl ester | 500 | −2.3 |
| -N'-methyl-piperazide | 100 | −1.4 |
| -β-phenylethylamide | 25 | −3.5 |
| -piperidide carbonyl | 50 | −1.8 |
| -phenylisopropylamide | 50 | −2.2 |

TABLE 6

| Anti-inflammatory activity test | Dosis, mg./kg. i.p. | Rate of inhibition, percent | $ED_{50}$, mg./kg. | $LD_{50}/ED_{50}$ |
|---|---|---|---|---|
| Carrageenin-oedema on rats | 50 | 32.7 | | |
| | 150 | 45.2 | 184 | 16.3 |
| | 300 | 64.4 | | |
| Phenylbutazon | | | 40 | 5.37 |
| Acetylsalicylic acid | | | 440 | 1.13 |
| Generalized dextran oedema on rats | 100 | 42.7 | | |
| Local dextran oedema on rats | 200 | 76.9 | | |
| Formaline oedema | 200 | 59.4 | | |
| Kaoline oedema | 250 | 51.2 | | |
| Adjuvant arthritis | 100 | (¹) | | |

¹ Strong inhibition.

TABLE 7

| Analgesic activity test | $ED_{50}$, mg./kg. | $LD_{50}/ED_{50}$ |
|---|---|---|
| Acteic acid writhing on mice | 12.5 | 240 |
| Acetylsalicylic acid | 35.0 | 14.3 |
| Bianchi-test on mice | 200.0 | |
| Electric tail stimulation on mice | 200 | 15.0 |
| Morphine | 15 | 61.3 |
| Codeine | 55 | 5.45 |

The invention is further elucidated by the aid of the examples. The examples are given for the purpose of illustration and not by way of limitation.

EXAMPLE 1

Into the cooled suspension of 16.8 g. (0.0668 mole) of (2 - amino - 4,5 - dimethoxyphenyl) - acetic acid isopropylamide in 150 ml. of water 16 ml. of concentrated hydrochloric acid are added dropwise. 5 g. of sodium nitrite in 10 ml. of water are added into the obtained light-coloured suspension with intensive stirring at a temperature of −5 to 0° C. After some minutes a brownish green solution is obtained. The solution is stirred for 15 minutes under cooling, and then for a further 15 minutes without cooling. The mixture is diluted with 100 ml. of water, and neutralized with solid sodium hydrocarbonate. The crystals which separate under cooling are filtered off and dried.

16.4 g. (94%) of 5,6 - dimethoxy - indazole - 3 - carboxylic acid isopropylamide are obtained. The product melts at 191–193° C. after recrystallization from ethanol.

Analysis.—Calcd. for $C_{13}H_{17}N_3O_3$ (263.303) (percent): C, 59.22; H, 6.51; N, 15.95. Found (percent): C, 58.64; H, 6.67; N, 15.54.

EXAMPLE 2

Into a cooled suspension of 23.8 g. (0.084 mole) of (2-amino-4,5-dimethoxyphenyl)-acetic anilide in 100 ml. of glacial acetic acid and 100 ml. of methanol, 20 ml. of concentrated hydrochloric acid are added with stirring, thereafter a solution of 8 g. of sodium nitrite in 15 ml. of water is poured into the mixture at a temperature below 0° C.

After 15 minutes the cooling bath is removed, and the mixture is stirred for an additional 2 hours, The mixture is diluted with 500 ml. of water, then it is let to crystallize in refrigerator. 22.2 g. (88%) of 5,6-dimethoxy-indazole-3-carboxylic anilide are obtained, M.P.: 221–222° C. (after recrystallization from alcohol-dimethylformamide).

Analysis.—Calcd. for $C_{16}H_{15}N_3O_3$ (297.320) (percent): C, 64.56; H, 5.85; N, 14.13. Found (percent): C, 64.02; H, 5.45; N, 13.79.

EXAMPLE 3

A mixture of 10.3 g. (0.032 mole) of (2-amino-4,5-dimethoxyphenyl) - acetic acid - p - chloro - anilide, 100 ml. of methanol and 100 ml. of acetic acid is treated with 10 ml. of hydrochloric acid, and thereafter with a solution of 3 g. of sodium nitrite in 10 ml. of water, as described in Example 2. 8.7 g. (87%) of 5,6-dimethoxy-indazole-3-carboxylic acid p-chloro-anilide are obtained, M.P.: 258° C. (after recrystallization from dimethylformamide).

Analysis.—Calcd. for $C_{16}H_{14}ClN_3O_3$ (351.769) (percent): C, 57.92; H, 4.26; Cl, 10.68; N, 12.66. Found (percent): C, 58.62; H, 4.52; Cl, 10.51; N, 12.76.

EXAMPLE 4

5 g. (0.014 mole) of (2-amino-4,5-dimethoxyphenyl)-acetic acid-m-trifluoromethylanilide in 50 ml. of methanol and 50 ml. of glacial acetic acid are reacted with 5 ml. of concentrated hydrochloric acid and 1.5 g. of sodium nitrite as described in Example 2. 4.2 g. (82%) of 5,6-dimethoxy - indazole - 3 - carboxylic acid - m - trifluoromethylanilide are obtained, M.P. 250–251° C. (after recrystallization from ethanol).

EXAMPLE 5

10 g. (0.034 mole) of (2-amino-4,5-dimethoxyphenyl)-acetic acid-hexylamine in 50 ml. of methanol and 50 ml. of glacial acetic acid are reacted with 10 ml. of concentrated hydrochloride acid and 5 g. of sodium nitrite as described in Example 2, with the exception, that the aqueous solution is neutralized with ammonium hydroxide and then it is extracted with chloroform. The obtained extract is evaporated, the residue is heated for a short period in the presence of 10 ml. of acetic anhydride, and at the end of the exothermic reaction the mixture is evaporated in vacuo. The residue is mixed with 50 ml. of ethanol and 10 ml. of 30% sodium hydroxide solution, and the obtained mixture is boiled for 2 hours. The mixture is diluted with 200 ml. of water, and acidified with hydrochloric acid. 7 g. (67%) of 5,6-dimethoxyindazole-3-carboxylic acid-hexylamide are obtained, M.P.: 123° C. (after recrystallization from benzene-petroleum ether).

Analysis.—Calcd. for $C_{16}H_{23}N_3O_3$ (305.384) (percent): C, 63.58; H, 7.59; N, 13.76. Found (percent): C, 63.27; H, 7.41; N, 13.91.

EXAMPLE 6

Into a solution of 12 g. (0.04 mole) of (2-amino-4,5-dimethoxyphenyl)-acetic acid-benzylamide in 200 ml. of glacial acetic acid 5 ml. of isopropylnitrite are added with stirring. The temperature of the mixture raises to 35° C. The dark solution is stirred for 2 hours, then it is poured on 500 ml. of ice-water. 10.9 g. (87%) of 5,6-dimethoxy - indazole - 3 - carboxylic acid-benzylamide are obtained, M.P.: 186–188° C. after recrystallization from ethanol.

Analysis.—Calcd. for $C_{17}H_{17}N_3O_3$ (311.347) (percent): C, 65.58; H, 5.53; N, 13.49. Found (percent): C, 65.60; H, 6.48; N, 13.21.

EXAMPLE 7

9 g. (0.031 mole) of (2-amino-4,5-dimethoxyphenyl)-acetic acid-cyclohexylamide in 100 ml. of glacial acetic acid and 20 ml. of methanol are reacted with 3 ml. of concentrated hydrochloric acid and an aqueous solution of 2.5 g. of sodium nitrite as described in Example 2. 8.6 g. (92%) of 5,6 - dimethoxy - indazole - 3 - carboxylic acid-cyclohexylamide are obtained, M.P.: 178–180° C. after recrystallization from benzene.

Analysis.—Calcd. for $C_{16}H_{21}N_3O_3$ (303.368) (percent): C, 63.58; H, 7.59; N, 13.76. Found (percent): C, 63.65; H, 7.38; N, 13.91.

EXAMPLE 8

0.5 g. sodium is added to a solution of 3 g. of 3,5-dimethoxy - indazole - 3 - carboxylic amide in 100 ml. of ethanol and the mixture is boiled for 30 minutes. The obtained light yellow precipitate is filtered off, washed with alcohol and ether, and dried. 92% of 5,6-dimethoxyindazole-3-carboxylic acid amide sodium salt are obtained, M.P.: 270–271° C.

EXAMPLE 9

A mixture of 10 g. (0.034 mole) of 5,6-dimethoxyindazole - 3 - carboxylic acid anilide and 20 ml. of acetic anhydride is heated to boiling. The mixture is cooled, the precipitated crystals are filtered off, washed with 50 ml. of alcohol and dried. 8.7 g. (83%) of 1-acetyl-5,6-dimethoxy - indazole - 3 - carboxylic acid anilide are obtained, M.P.: 253–254° C.

Analysis.—Calcd. for $C_{16}H_{17}N_3O_4$ (315.336) (percent): C, 60.94; H, 5.43; N, 13.32. Found (percent): C, 61.84; H, 5.21; N, 13.50.

EXAMPLE 10

16.3 g. (0.054 mole) of (2-amino-4,5-dimethoxyphenyl)-acetic acid-p-toluidide in 100 ml. of acetic acid and 10 ml. of methanol are reacted with 15 ml. of concentrated hydrochloric acid and a solution of 4 g. of sodium nitrite in 10 ml. of water as described in Example 2. 10 g. (60%) of 5,6-dimethoxy-indazole-3-carboxylic acid-p-toluidide are obtained, M.P.: 260° C. after recrystallization from ethanol.

Analysis.—Calcd. for $C_{17}H_{17}N_3O_3$ (311.347) (percent): C, 65.58; H, 5.53; N, 13.49. Found (percent): C, 65.52; H, 5.17; N, 13.91.

EXAMPLE 11

A mixture of 2 g. of 5,6 - dimethoxy-indazole-3-carboxylic acid-p-chloro-anilide and 10 ml. of acetic anhydride is heated to boiling, and after cooling the mixture is stirred with a little ether. The precipitated 2 g. (90%) of 1-acetyl - 5,6 - dimethoxy-indazole-3-carboxylic acid-p-chloro-anilide is recrystallized from the mixture of ethanol and dimethylformamide. The product melts at 218° C.

Analysis.—Calcd. for $C_{18}H_{16}ClN_3O_4$ (373.807) (percent): C, 57.84; H, 4.26; Cl, 9.49; N, 11.24. Found (percent): C, 57.75; H, 4.83; Cl, 9.44; N, 11.60.

EXAMPLE 12

2.5 g. (0.008 mole) of 5,6-dimethoxy-indazole-3-carboxylic acid-m-trifluormethyl-anilide are reacted with 5 ml. of acetic anhydride as described in Example 11. 2.6 g. (80%) of 1 - acetyl-5,6-dimethoxy-indazole-3-carboxylic acid-m-trifluoromethyl-anilide are obtained, M.P.: 217–219° C.

EXAMPLE 13

57 g. (0.27 mole) of (2-amino-4,5-dimethoxyphenyl)-acetamide are suspended in 500 ml. of water, and 70 ml. of concentrated hydrochloric acid are added to the suspension with stirring and cooling. Thereafter a solution of 21 g. of sodium nitrite in 30 ml. of water are added to the mixture at a temperature below 0° C., with intensive stirring. The mixture is stirred for 2 hours, then 500 ml. of water are added, and the mixture is alkalinized with ammonium hydroxide to pH=5. The separated 5,6-dimethoxy-indazole - 3 - carboxylic amide is filtered off, washed with water and dried. 55 g. (95%) of the above compound are obtained, M.P.: 223° C. after recrystallization from methanol.

*Analysis.*—Calcd. for $C_{10}H_{11}N_3O_3$ (221.222) (percent): C, 54.29; H, 5.01; N, 18.99. Found (percent): C, 54.81; H, 5.48; N, 19.90.

EXAMPLE 14

2 g. of 5,6-dimethoxy-indazole-3-carboxylic amide are reacted with 10 ml. of acetic anhydride as described in Example 11. 2 g. (83%) of 1-acetyl - 5,6 - dimethoxy-indazole-3-carboxylic amide are obtained, M.P.: 263° C.

*Analysis.*—Calcd. for $C_{12}H_{13}N_3O_4$ (263.260) (percent): C, 54.75; H, 5.01; N, 15.96. Found (percent): C, 54.79; H, 5.25; N, 15.40.

EXAMPLE 15

A mixture of 2 g. of 5,6 - dimethoxy-indazole - 3 - carboxylic amide, 20 ml. of chloroform and 5 ml. of acetic anhydride is boiled for 30 minutes. After cooling 2.1 g. (88%) of 1 - acetyl-5,6-dimethoxy-indazole-3-carboxylic amide separate, identical to the product obtained in Example 14.

EXAMPLE 16

A mixture of 2 g. of 5,6-dimethoxy-indazole-3-carboxylic amide, 20 ml. of chloroform and 5 ml. of acetyl chloride is boiled for 30 minutes. 2 g. (83%) of 1-acetyl-5,6 - dimethoxy-indazole - 3 - carboxylic amide separate, identical to the product of Example 14.

EXAMPLE 17

5.3 g. (0.02 mole) of (2-amino-4,5-dimethoxyphenyl)-acetic acid diethylamide in 50 ml. of methanol and 50 ml. of glacial acetic acid are reacted with 10 ml. of concentrated hydrochloric acid and an aqueous solution of 2 g. of sodium nitrite, as described in Example 2. 3.8 g. (68%) of 5,6-dimethoxy-indazole-3-carboxylic acid diethylamide are obtained, M.P.: 143° C. after recrystallization from benzene.

*Analysis.*—Calcd. for $C_{14}H_{19}N_3O_3$ (277.330) (percent): C, 60.63; H, 6.90; N, 15.16. Found (percent): C, 60.61; H, 7.17; N, 14.80.

EXAMPLE 18

The product of Example 17 is reacted as described in Example 9. 83% of 1 - acetyl-5,6-dimethoxy-indazole-3-carboxylic acid diethylamide are obtained, M.P. 120–121° C. after recrystallization from benzene-cyclohexane.

*Analysis.*—Calcd. for $C_{16}H_{21}N_3O_3$ (319.37) (percent): C, 60.17; H, 6.61; N, 13.15. Found (percent): C, 60.24; H, 6.42; N, 13.02.

EXAMPLE 19

A mixture of 6.17 g. (0.02 mole) of (2-amino-4,5-dimethoxyphenyl)-acetic acid-α-naphthylamide, 50 ml. of acetic acid, 20 ml. of ethanol and 5 ml. of concentrated hydrochloric acid is reacted with 1.6 g. of sodium nitrite as described in Example 2. 5.5 g. (80%) of 5,6-dimethoxy-indazole - 3 - carboxylic acid-α-naphthylamide are obtained. M.P.: 295–297° C. after recrystallization from alcohol.

*Analysis.*—Calcd. for $C_{20}H_{17}N_3O_3$ (347.380) (percent): C, 69.15; H, 4.93; N, 12.09. Found (percent): C, 68.45; H, 5.20; N, 12.30.

EXAMPLE 20

A mixture of 15 g. (0.04 mole) of (2-amino-4,5-dimethoxyphenyl)-acetic acid-β-(3′,4′ - dimethoxyphenyl)-ethyl-amide, 100 ml. of acetic acid, 10 ml. of methanol and 5 ml. of concentrated hydrochloric acid is reacted with 4 g. of sodium nitrite as described in Example 2. 14 g. (91%) of 5,6-dimethoxy-indazole-3-carboxylic acid-β-3′,4′-dimethoxyphenyl-ethyl-amide are obtained, M.P.: 157–159° C. after recrystallization from ethanol.

*Analysis.*—Calcd. for $C_{20}H_{23}N_3O_5$ (385.328) (percent): C, 62.32; H, 6.01; N, 10.90. Found (percent): C, 62.17; H, 6.53; N, 11.25.

EXAMPLE 21

Into the solution of 9 g. (0.03 mole) of (2-amino-4,5-dimethoxyphenyl)-acetic acid-benzylamide in 50 ml. of glacial acetic acid 4 ml. of isoamylnitrite are added with stirring. Thereafter one proceeds as described in Example 5. 6.8 g. (73%) of 5,6-dimethoxy-indazole-3-carboxylic acid benzylamide are obtained, the analysis data of which are identical to that described in Example 5.

EXAMPLE 22

A mixture of 8.7 g. (0.03 mole) of (2-amino-4,5-dimethoxyphenyl)-acetic acid-N′-methyl-piperazide, 50 ml. of glacial acetic acid and 4 ml. of isopropylnitrite is stirred for 2 hours at 20–30° C. The obtained solution is poured on 500 ml. of ice-water, alkalinized with ammonia to pH=9, and extracted with chloroform. The extract is washed with water, dried over $Na_2SO_4$, and acidified with ethanolic hydrochloric acid under cooling. The separated crystals are filtered off, washed with acetone and dried. 7.2 g. (71%) of 5,6 - dimethoxy-indazole-3-carboxylic acid-N′-methylpiperazide-hydrochloride are obtained.

*Analysis.*—Calcd. for $C_{15}H_{21}ClN_4O_3$ (340.805) (percent): C, 52.86; H, 6.21; Cl, 10.40; N, 16.21. Found (percent): C, 52.31; H, 6.15; Cl, 16.02; N, 16.45.

EXAMPLE 23

A mixture of 7.2 g. (0.02 mole) of (2-amino-4,5-dimethoxyphenyl)-acetic acid-n-decylamide, 30 ml. of water and 5 ml. of hydrochloric acid is reacted at 0° C. with a solution of 1.5 g. of $NaNO_2$ in 3 ml. of water for 15 minutes with stirring, and thereafter the cooling bath is removed. The mixture is stirred for an additional one hour, then 100 ml. of water are added, and the mixture is alkalinized with ammonium hydroxide to pH=9. The mixture is extracted with 3× 20 ml. of chloroform, the extract is washed with water, dried over $Na_2SO_4$ and evaporated. 7 g. (97%) of 5,6-dimethoxy-indazole-3-carboxylic acid-n-decylamine are obtained, in the form of a brown oil.

EXAMPLE 24

2.9 g. (0.012 mole) of 2-amino-homoveratrumic acid ethyl ester is dissolved in 30 ml. of a 1:1 mixture of alcohol and glacial acetic acid, the solution is cooled to −6° C., 2 ml. of concentrated hydrochloric acid are added, and then a solution of 0.9 g. of sodium nitrite in 6 ml. of water is dropped into the mixture. Dark blue solution is obtained. The mixture is stirred for additional 30 minutes at the same temperature, then it is allowed to warm slowly to room temperature. The blue colour disappears and abundant white precipitate separates. The mixture is diluted with 2-fold quantity of water, then it is filtered and the precipitate is washed with water. 2.4 g. (80%) of crude product is obtained, M.P.: 222° C. The crude product is recrystallized from 40 ml. of nitromethane. 2.2 g. (73%) of 5,6-dimethoxy-indazole-3-carboxylic acid-ethyl ester are obtained, M.P.: 223–224° C.

*Analysis.*—Calcd. for $C_{12}H_{14}N_2O_4$ (250.26) (percent): C, 57.57; H, 5.63; N, 11.19. Found (percent): C, 57.64; H, 5.72; N, 11.37.

EXAMPLE 25

A mixture of 0.25 g. (0.01 mol) of 5,6-dimethoxy-indazole-3-carboxylic acid-ethyl ester and 5 ml. of n-hexylamine is boiled under reflux for 8 hours. Thereafter the excess of the amine is distilled off, and the residual oil is treated with 2 ml. of cyclohexane. 0.22 g. of a white crystalline substance is obtained, M.P.: 113° C. The obtained crude substance is recrystallized twice from 5-fold quantity of toluene. 0.16 g. (52%) of 5,6-dimethoxy-indazole-3-carboxylic acid-n-hexylamide are obtained, M.P.: 120–122° C. The product does not show melting point depression in admixture with the authentic sample.

*Analysis.*—Calcd. for $C_{16}H_{23}N_3O_3$ (305.38) (percent): N, 13.76. Found (percent): N, 13.56.

EXAMPLE 26

A mixture of 0.25 g. (0.01 mole) of 5,6-dimethoxy-indazole-3-carboxylic acid ethyl ester and 5 ml. of freshly distilled cyclohexylamine is refluxed for 14 hours. The mixture is evaporated to dryness in vacuo, and the residual oil is treated with 2 ml. of hot methanol. The mixture is filtered and the product is precipitated from the filtrate with 10 ml. of water. 0.26 g. of crude substance are obtained, M.P.: 163° C. The obtained products is recrystallized from 3 ml. of toluene, and then from 2 ml. of nitromethane. 0.14 g. (46%) of 5,6-dimethoxy-indazole-3-carboxylic acid-cyclohexylamide are obtained, M.P.: 169–171° C.

*Analysis.*—Calcd. for $C_{10}H_{21}N_3O_3$ (303.36) (percent): N, 13.85. Found (percent): N, 13.50.

EXAMPLE 27

A mixture of 15.3 g. (0.1 mole) of 4-amino-veratrol, 500 ml. of water, 10 ml. of sulfuric acid, 16 g. of chloralhydrate and 7 g. of hydroxylamine hydrochloride is boiled for 2 hours. The separated precipitate is filtered off, dissolved in ice-cold 3% sodium hydroxide solution, and precipitated with 3% hydrochloric acid under cooling. The precipitate is filtered off, and added into 100 ml. of 90% sulfuric acid with stirring. The temperature of the acid is maintained at 40° C. during the addition. Thereafter the mixture is stirred for 5 minutes at 80° C. then poured on ice, the separated precipitate is suspended in 100 ml. of water, and dissolved by the dropwise addition of aqueous alkaline solution. 6 g. of $NaNO_2$ are added to the solution, the mixture is cooled to 5° C. in ice, and is added to the mixture of 200 ml. of water and 12 ml. of sulfuric acid at 0° C. with stirring. The reaction takes place with vigorous foaming, and separation of a yellowish precipitate. After 30 minutes of stirring a solution of 50 g. of $SnCl_2$ in 300 ml. of hydrochloric acid are added into the mixture, and the mixture is stirred for additional 3 hours. The mixture is alkalinized with an alkaline solution, stirred at 70° C., cooled and acidified with hydrochloric acid, 5 g. of 5,6-dimethoxy-indazole-carboxylic acid separate, M.P.: 249° C., after recrystallization from alcohol.

*Analysis.*—Calcd. for $C_{10}H_{10}N_2O_4$ (222.21) (percent): N, 12.61. Found (percent): N, 12.57.

EXAMPLE 28

A mixture of 11 g. (0.05 mole) of 5,6-dimethoxy-indazole-3-carboxylic acid, 250 ml. of ethanol and 5 ml. of sulfuric acid is boiled for 4 hours, then the mixture is cooled, the separated crystals are filtered off and washed with ether. 10 g. (80%) of 5,6-dimethoxy-indazole-3-carboxylic acid ethyl ester are obtained, M.P.: 223° C.

*Analysis.*—Calcd. for $C_{12}H_{14}N_2O_4$ (250.26) (percent): C, 57.57; H, 5.64; N, 11.19. Found (percent): C, 57.64; H, 5.72; N, 11.37.

EXAMPLE 29

A mixture of 4.4 g. (0.02 mole) of 5,6-dimethoxy-indazole-3-carboxylic acid and 5 ml. of β-phenylethylamine is heated at 140–160° C. for 5 hours under nitrogen atmosphere. The mixture is cooled, water is added, and then the mixture is acidified with dilute hydrochloric acid under cooling. The separated amorphous product is recrystallized from alcohol. 4.2 g. (50%) of 5,6-dimethoxy-indazole-3-carboxylic acid-β-phenylethylamine are obtained, M.P.: 184° C.

*Analysis.*—Calcd. for $C_{18}H_{19}N_3O_3$ (325.35) (percent): C, 66.45; H, 5.89; N, 12.92. Found (percent): C, 66.01; H, 6.33; N, 12.58.

EXAMPLE 30

A mixture of 11 g. (0.05 mole) of 5,6-dimethoxy-indazole-3-carboxylic acid and 50 ml. of thionylchloride is boiled for 3 hours with stirring. A solid mass precipitates. The excess of thionylchloride is evaporated, the residue is suspended in benzene, and the suspending agent is distilled off. The obtained amorphous, yellowish-brown substance is suspended in 100 ml. of dioxane, 8 ml. of benzylamine are added to the suspension, and the mixture is boiled for 2 hours. Then the mixture is poured into 1 l. of ice water, and acidified with dilute hydrochloric acid. 5,6-dimethoxy-indazole-3-carboxylic acid benzylamide is obtained, identical to the product of Example 6.

EXAMPLE 31

2.2 g. (0.01 mole) of 5,6-dimethoxy-indazole-3-carboxylic acid and 2 g. of hexylamine are suspended in 50 ml. of dioxane, and a solution of 2.2 g. of N,N-dicyclohexylcarbodiimide in 15 ml. of dioxane is added to the suspension. The mixture is stirred for some hours, then left to stand overnight. The separated crystals are filtered off, and the filtrate is evaporated in vacuo. The residue is triturated with dilute hydrochloric acid, when it solidifies. The substance is filtered off, dried and recrystallized from toluene. 1.5 g. (50%) of 5,6-dimethoxy-indazole-3-carboxylic acid hexylamide are obtained, identical to the product of Example 5.

EXAMPLE 32

2.3 g. (0.012 mole) of 2-amino-4,5-dimethoxy-phenylacetonitrile are reacted as described in Example 24 to form 2.2 g. (90%) of 5,6-dimethoxy-indazole-3-carboxylic acid nitrile. The product melts at 218° C. after recrystallization from alcohol.

*Analysis.*—Calcd. for $C_{10}H_9N_3O_2$ (203.21) (percent): C, 59.10; H, 4.46; N, 20.68. Found (percent): C, 59.40; H, 4.81; N, 20.20.

EXAMPLE 33

The process of Example 25 is repeated with the exception that piperidine is used in the place of hexylamine. 5,6-dimethoxy-indazole-3-carboxylic acid-piperidide is obtained, M.P.: 92° C. after recrystallization from benzene.

*Analysis.*—Calcd. for $C_{15}H_{20}N_3O_3$ (290.33) (percent): C, 62.05; H, 6.94; N, 14.47. Found (percent): C, 62.38; H, 6.80; N, 14.99.

EXAMPLE 34

The process described in Example 30 is repeated with the exception that benzylamine is replaced by phenylisopropylamine. 5,6-dimethoxy-indazole - 3 - carboxylic acid-phenyl-isopropylamide is obtained, M.P.: 186° C. after recrystallization from alcohol.

*Analysis.*—Calcd. for $C_{19}H_{19}N_3O_3$ (337.36) (percent): C, 67.64; H, 5.68; N, 12.46. Found (percent): C, 67.34; H, 5.45; N, 13.16.

EXAMPLE 35

The process described in Example 30 is repeated with the exception that benzylamine is replaced by N-methyl-piperazine. The obtained 5,6-dimethoxy-indazole-3-carboxylic acid N-methyl-piperazide is converted into its hydrochloride, which melts at 298° C.

*Analysis.*—Calcd. for $C_{15}H_{20}N_4O_3 \cdot HCl$ (340.81) percent): C, 52.86; H, 6.21; Cl, 10.40; N, 16.44. Found (percent): C, 52.25; H, 6.84; Cl, 10.03; N, 16.63.

EXAMPLE 36

A mixture of 2 g. (0.01 mole( of 5,6-dimethoxy-indazole-3-carboxylic acid nitrile and 10 ml. of concentrated hydrochloric acid is heated at 50–60° C. for one hour. The obtained solution is maintained at room temperature for some hours, then it is diluted with 100 ml. of water and neutralized with ammonia. 1 g. of 5,6-dimethoxy-indazole-3-carboxylic amide separates, M.P.: 223° C., identical to the product of Example 13.

EXAMPLE 37

A mixture of 10.5 g. (0.05 mole) of 5,6-dimethoxy-indazole-3-carboxylic amide, 20 ml. of acetic acid and 40 ml. of concentrated hydrochloric acid is boiled for 8 hours, then 300 ml. of water are added to the mixture. On cooling 7.5 g. of 5,6-dimethoxy-indazole-3-carboxylic acid crystallizes from the mixture, identical to the product of Example 27.

EXAMPLE 38

A mixture of 2.5 g. (0.01 mole) of 5,6-dimethoxy-indazole-3-carboxylic acid ethyl ester and 10 ml. of 10% aqueous sodium hydroxide is boiled for 3 hours. The obtained solution is acidified with 3% aqueous hydrochloric acid under cooling. 1.8 g. of 5,6-dimethoxy-indazole-3-carboxylic acid are obtained, identical to the product of Example 37.

What we claim is:

1. A 5,6-dimethoxy-indazole-3-carboxylic amide derivative of the formula

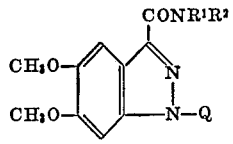

wherein
$R^1$ and $R^2$ are independently selected from the group consisting of hydrogen, straight chained alkyl of 1 to 16 carbon atoms, branched alkyl of 3 to 16 carbon atoms, cyclohexyl, naphthyl, phenyl, phenyl lower alkyl, substituted phenyl and substituted phenyl lower alkyl wherein the substitution is with one to two substituents selected from the group consisting of methyl, methoxy, trifluoromethyl and halogen, and $R^1$ and $R^2$ together with the adjacent nitrogen atom and optionally with a further nitrogen atom may form a 6 membered heterocyclic group selected from the group consisting of piperidino, piperazino, and N-methyl-piperazino, Q is a member selected from the group consisting of hydrogen, alkali metal and alkanoyl of 1 to 5 carbon atoms.

2. 5,6-dimethoxy-indazole-3-carboxylic acid isopropyl-amide.
3. 5,6-dimethoxy-indazole-3-carboxylic acid anilide.
4. 5,6-dimethoxy-indazole-3-carboxylic acid p-chloro-anilide.
5. 5,6-dimethoxy-indazole-3-carboxylic acid m-trifluoromethyl-anilide.
6. 5,6-dimethoxy-imidazole-3-carboxylic acid hexyl-amide.
7. 5,6-dimethoxy-indazole - 3 - carboxylic acid benzyl-amide.
8. 5,6-dimethoxy-indazole-3-carboxylic acid cyclohexyl-amide.
9. 5,6-dimethoxy-indazole-3-carboxylic amide sodium salt.
10. 1 - acetyl-5,6-dimethoxy-indazole-3-carboxylic acid anilide.
11. 5,6-dimethoxy-indazole - 3 - carboxylic acid p-toluidide.
12. 1 - acetyl-5,6-dimethoxy-indazole-3-carboxylic acid p-chloro-anilide.
13. 1 - acetyl-5,6-dimethoxy-indazole-3-carboxylic acid m-trifluoromethyl-anilide.
14. 5,6-dimethoxy-indazole-3-carboxylic amide.
15. 1-acetyl - 5,6 - dimethoxy-indazole - 3 - carboxylic amide.
16. 5,6-dimethoxy-indazole-3-carboxylic acid diethylamide.
17. 1-acetyl-5,6-dimethoxy-indazole - 3-carboxylic acid diethylamide.
18. 5,6-dimethoxy-indazole-3-carboxylic acid α-naphthylamide.
19. 5,6-dimethoxy-indazole-3-carboxylic acid β-(3',4'-dimethoxyphenyl)-ethyl-amide.
20. 5,6-dimethoxy-indazole-3-carboxylic acid-N'-methylpiperazide hydrochloride.
21. 5,6-dimethoxy-indazole-3-carboxylic acid m-decyl-amide.
22. 5,6-dimethoxy-indazole - 3 - carboxylic acid ethyl ester.
23. 5,6-dimethoxy-indazole-3-carboxylic acid.
24. 5,6-dimethoxy-indazole-3-carboxylic acid β-phenyl-ethylamide.
25. 5,6-dimethoxy-indazole-3-carboxylic acid nitrile.
26. 5,6-dimethoxy-indazole - 3 - carboxylic acid piperidide.
27. 5,6 - dimethoxy-indazole-3-carboxylic acid-phenyl-isopropylamide.
28. 5,6-dimethoxy-indazole-3-carboxylic acid-N-methylpiperazide.

References Cited

UNITED STATES PATENTS

| | | | |
|---|---|---|---|
| 3,457,269 | 7/1969 | Kirchner | 260—310 C |
| 3,007,938 | 11/1961 | Kirchner | 260—310 C |
| 3,145,215 | 8/1964 | Kirchner | 260—310 C |
| 3,567,721 | 3/1971 | Wajngurt | 260—310 C |

OTHER REFERENCES

Piozzi et al.: Gazz. Chim. Ital., vol. 93, pp. 3–14 (1963).

Piozzi et al.: Chem. Abst., vol. 59, columns 596–7 (1963).

Buu-Hoi et al.: J. Heterocyclic Chem., vol. 1, pp. 239–41 (1964).

Kochetkov et. al.: Zhur. Obshchei Khim., vol. 31, pp. 201–4 (1961).

Dudykina et al.: Zhur. Obshchei Khim., vol. 32, pp. 81–4 (1962).

Snyder et al.: J. Amer. Chem. Soc., vol. 74, pp. 2009–12 (1952).

Snyder et al.: J. Amer. Chem. Soc., vol. 76, pp. 1298–1301 (1954).

NATALIE TROUSOF, Primary Examiner

U.S. Cl. X.R.

260—250 R, 465 E, 471 R, 559 A; 424—273